US012803540B2

(12) United States Patent
Kim

(10) Patent No.: US 12,803,540 B2
(45) Date of Patent: Nov. 17, 2026

(54) SECURITY CHIP AND CLOCK GATING METHOD THEREOF

(71) Applicant: SAMSUNG ELECTRONICS CO., LTD., Suwon-si (KR)

(72) Inventor: Ki Hong Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/823,786

(22) Filed: Sep. 4, 2024

(65) Prior Publication Data

US 2025/0233580 A1 Jul. 17, 2025

(30) Foreign Application Priority Data

Jan. 15, 2024 (KR) ........................ 10-2024-0005926

(51) Int. Cl.
*H03K 3/037* (2006.01)
*G06F 1/12* (2006.01)
*G06F 21/75* (2013.01)
*H03K 3/84* (2006.01)
*H03K 19/20* (2006.01)

(52) U.S. Cl.
CPC ............... *H03K 3/037* (2013.01); *G06F 1/12* (2013.01); *G06F 21/75* (2013.01); *H03K 3/84* (2013.01); *H03K 19/20* (2013.01)

(58) Field of Classification Search
CPC .......... H03K 19/20; H03K 3/84; H03K 3/037; G06F 21/75; G06F 1/12
See application file for complete search history.

(56) References Cited

U.S. PATENT DOCUMENTS

| | | | | |
|---|---|---|---|---|
| 6,566,858 | B1 | 5/2003 | Silverbrook et al. | |
| 7,500,110 | B2 | 3/2009 | Peeters et al. | |
| 9,158,939 | B2 * | 10/2015 | Yoshimi | H04L 9/0866 |
| 9,891,654 | B2 | 2/2018 | Sinha et al. | |
| 11,985,235 | B2 * | 5/2024 | Obadia | H04L 9/0855 |
| 12,182,246 | B2 * | 12/2024 | Wang | G06F 21/34 |
| 2012/0159187 | A1 | 6/2012 | Liu et al. | |
| 2014/0068280 | A1 * | 3/2014 | Yoshimi | H04L 9/0866 713/194 |
| 2020/0104528 | A1 * | 4/2020 | Fu | G06F 21/6245 |

(Continued)

FOREIGN PATENT DOCUMENTS

| | | |
|---|---|---|
| CN | 100371857 | 2/2008 |
| CN | 202189369 U | 4/2012 |
| CN | 102735985 A | 10/2012 |

OTHER PUBLICATIONS

Extended European Search Report dated May 7, 2025 issued in corresponding European Patent Application No. 24210854.6.

*Primary Examiner* — Thomas J. Hiltunen
*Assistant Examiner* — Khareem E Almo
(74) *Attorney, Agent, or Firm* — Morgan, Lewis & Bockius LLP

(57) ABSTRACT

A security chip including: a clock gating type generator configured to generate a clock gating type based on chip-specific parameters; and a main operation unit including a plurality of flip-flop groups, wherein each of the plurality of flip-flop groups is configured to receive a clock signal at a clock input terminal in a first gating mode or a second gating mode, wherein the first gating mode results in a different current consumption pattern compared to the second gating mode.

20 Claims, 12 Drawing Sheets

(56) References Cited

U.S. PATENT DOCUMENTS

| | | | | |
|---|---|---|---|---|
| 2022/0083665 | A1* | 3/2022 | Kocher | H04L 9/3247 |
| 2022/0200655 | A1* | 6/2022 | Abdelmoneum | G09C 1/00 |
| 2023/0124622 | A1* | 4/2023 | Guruprasad | H03K 19/17768<br>327/100 |
| 2023/0195941 | A1 | 6/2023 | Lee et al. | |
| 2024/0256679 | A1* | 8/2024 | Dasari | G06F 21/602 |

* cited by examiner

1211b

SECURITY CHIP AND CLOCK GATING METHOD THEREOF

CROSS-REFERENCE TO RELATED APPLICATION

This application claims priority under 35 U.S.C. § 119 to Korean Patent Application No. 10-2024-0005926 filed on Jan. 15, 2024, in the Korean Intellectual Property Office, the disclosure of which is incorporated by reference herein in its entirety.

TECHNICAL FIELD

Embodiments of the present disclosure described herein relate to a semiconductor device, and more specifically, to a security chip designed to prevent template attacks and a clock gating method thereof.

DISCUSSION OF RELATED ART

Smart cards can store personal information or function as an electronic wallet (E-purse), necessitating a high level of security to protect stored data from external attacks. Various security attack technologies targeting smart cards are continually emerging. Notably, a template attack, a type of security attack, involves collecting the current profile of a sample chip during its operation to create a template. Once this template is configured, the attacker collects the current profile of the target chip and compares it to the template to deduce the key value of the target chip.

As template attack techniques continually evolve, so do methods for constructing templates. Therefore, preventing template attacks through the simple generation of random currents inside the chip during its operation may not be effective.

SUMMARY

Embodiments of the present disclosure provides a security chip capable of preventing template attacks and clock gating method thereof.

An embodiment of the present invention provides a security chip including: a clock gating type generator configured to generate a clock gating type based on chip-specific parameters; and a main operation unit including a plurality of flip-flop groups, wherein each of the plurality of flip-flop groups is configured to receive a clock signal at a clock input terminal in a first gating mode or a second gating mode, wherein the first gating mode results in a different current consumption pattern compared to the second gating mode.

An embodiment of the present invention provides a clock gating method of a security chip including: generating a plurality of clock gating types, each clock gating type corresponding to a unique bit string of the security chip; distributing the clock gating types to a plurality of flip-flop groups included in the security chip; and transmitting a clock signal to clock input terminals of flip-flops in at least one of the plurality of flip-flop groups in a first gating mode or a second gating mode based on a clock gating type assigned to the at least one of the flip-flop group, wherein the first gating mode and the second gating mode are associated with different current consumption patterns.

An embodiment of the present invention provides a security chip including: a clock gating type generator configured to generate a chip-specific clock gating type; and a plurality of flip-flop groups, wherein each of the plurality of flip-flop groups is configured to be set to a clock gating mode with different current consumption patterns based on the clock gating type, wherein each of the plurality of flip-flop groups includes: at least one flip-flop configured to receive input data synchronized with a clock signal; and a gating control circuit configured to transmit or block the clock signal to a clock input terminal of the at least one flip-flop in response to a latch control signal and the clock gating type.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

It is to be understood that both the foregoing general description and the following detailed description are examples. Additional details of the claimed invention are provided within this document. Reference signs are used in example embodiments of the present invention, as illustrated in the accompanying reference drawings. Wherever possible, the same reference numbers are used in both the description and the drawings to refer to identical or similar parts.

Figure 1:
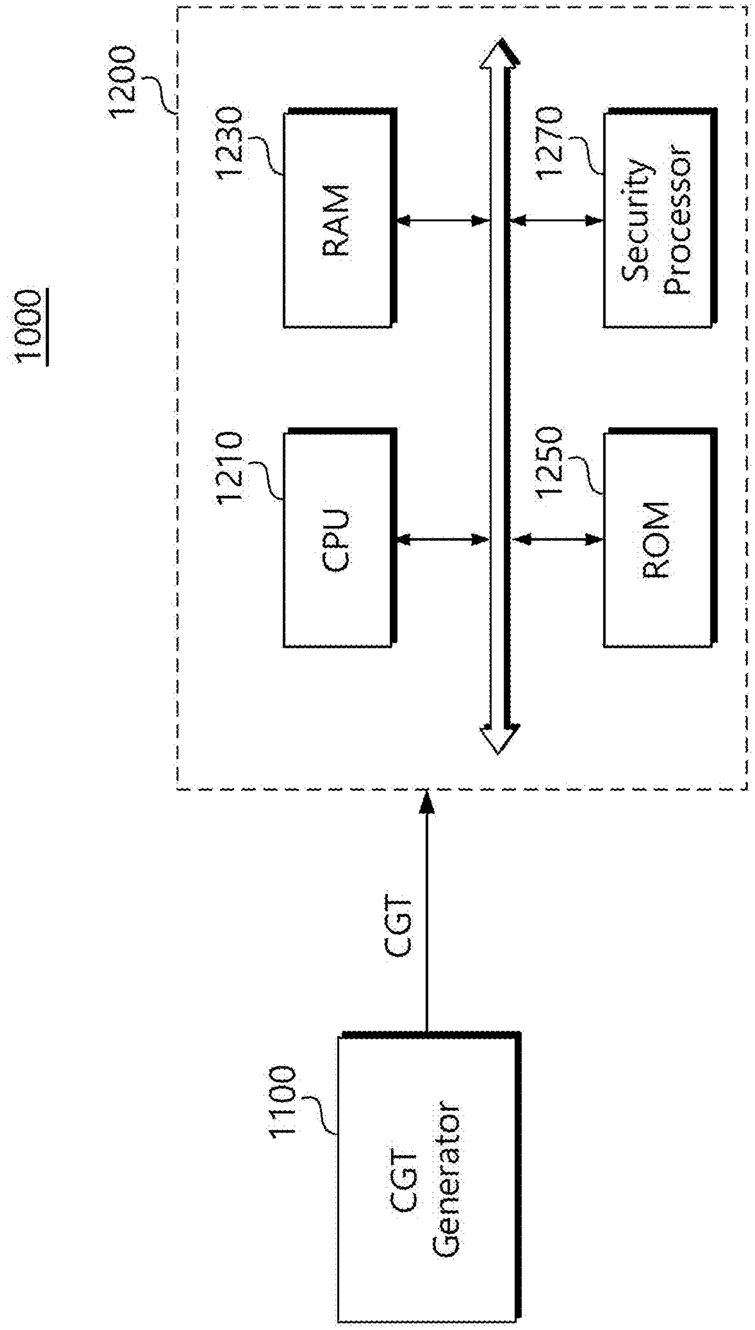
FIG. 1 is a block diagram showing a security chip according to an embodiment of the present invention.

FIG. 1 is a block diagram showing a security chip according to an embodiment of the present invention. Referring to FIG. 1, the security chip 1000 may include a clock gating type generator 1100 and a main operation unit 1200. The security chip 1000 may be any one of various chips that store a security key, such as a smart card or a security card.

The clock gating type generator 1100 may generate a clock gating type CGT unique to the security chip 1000. The clock gating type CGT may be a bit string generated based on a unique parameter or constant of the security chip 1000 itself. For example, the clock gating type CGT could be a parameter determined by the distribution of the production process of the security chip 1000, a random number sequence generated based on a physically unclonable function PUF, or a random number sequence based on a unique identifier ID of the chip. In other words, the clock gating type CGT may have an unique value for each individual chip even if they are the same type of security chip 1000.

The main calculation unit 1200 performs the main calculation functions of the security chip 1000. The main operation unit 1200 may receive data from external sources, process it, and output the results according to external requests. The main operation unit 1200 may include a CPU 1210, RAM 1230, ROM 1250, and a security processor 1270. The CPU 1210 drives applications or software loaded into the RAM 1230. Data to be processed by the main operation unit 1200, an operating system, firmware, and applications are loaded into the RAM 1230. The ROM 1250 stores non-volatile data, application programs, the operating system of the CPU 1210, and constant parameters. During booting, the ROM 1250 provides this information to the RAM 1230. The security processor 1270 may be configured to perform an operation for encrypting, decrypting, or signing a message transmitted to the main operation unit 1200 using an encryption function.

In particular, the CPU 1210, RAM 1230, ROM 1250, and security processor 1270, which constitute the main operation unit 1200, use a plurality of flip-flops FF for data transfer, input/output, and storage. In the present invention, the plurality of flip-flops FF are grouped into a plurality of flip-flop groups FFG, and a clock gating type CGT is provided for each flip-flop group FFG. In other words, a first flip-flop group FFG1 may be provided with a clock gating type CGT of logic '1', and a second flip-flop group FFG2 may be provided with a clock gating type CGT of logic '0'. The clock gating type CGT is a logic signal that defines the clock gating method of the flip-flop groups FFG and does not affect calculation operations. For example, a clock signal is continuously provided to the clock input terminal of the flip-flop in the first flip-flop group FFG1 if it is assigned with a clock gating type CGT of logic '1'. On the other hand, transmission of the clock signal to the clock input terminal of the flip-flop of the second flip-flop group FFG2, assigned with a clock gating type CGT of logic '0', may be blocked. Therefore, depending on whether the toggled clock signal is transmitted, the flip-flop groups will exhibit different current consumption patterns, levels of current consumption, and power magnitude. In addition, the current profile of the security chip 1000 may be altered in various ways according to the pattern of the clock gating type CGT assigned to each flip-flop group.

In the above security chip 1000 of the present invention, individual security chips 1000 may exhibit different current consumption characteristics even if they are the same type of chip, depending on the chip's unique clock gating type CGT setting. Therefore, it is possible to defend the security chip 1000 from template attacks that collect current profiles.

Figure 2:
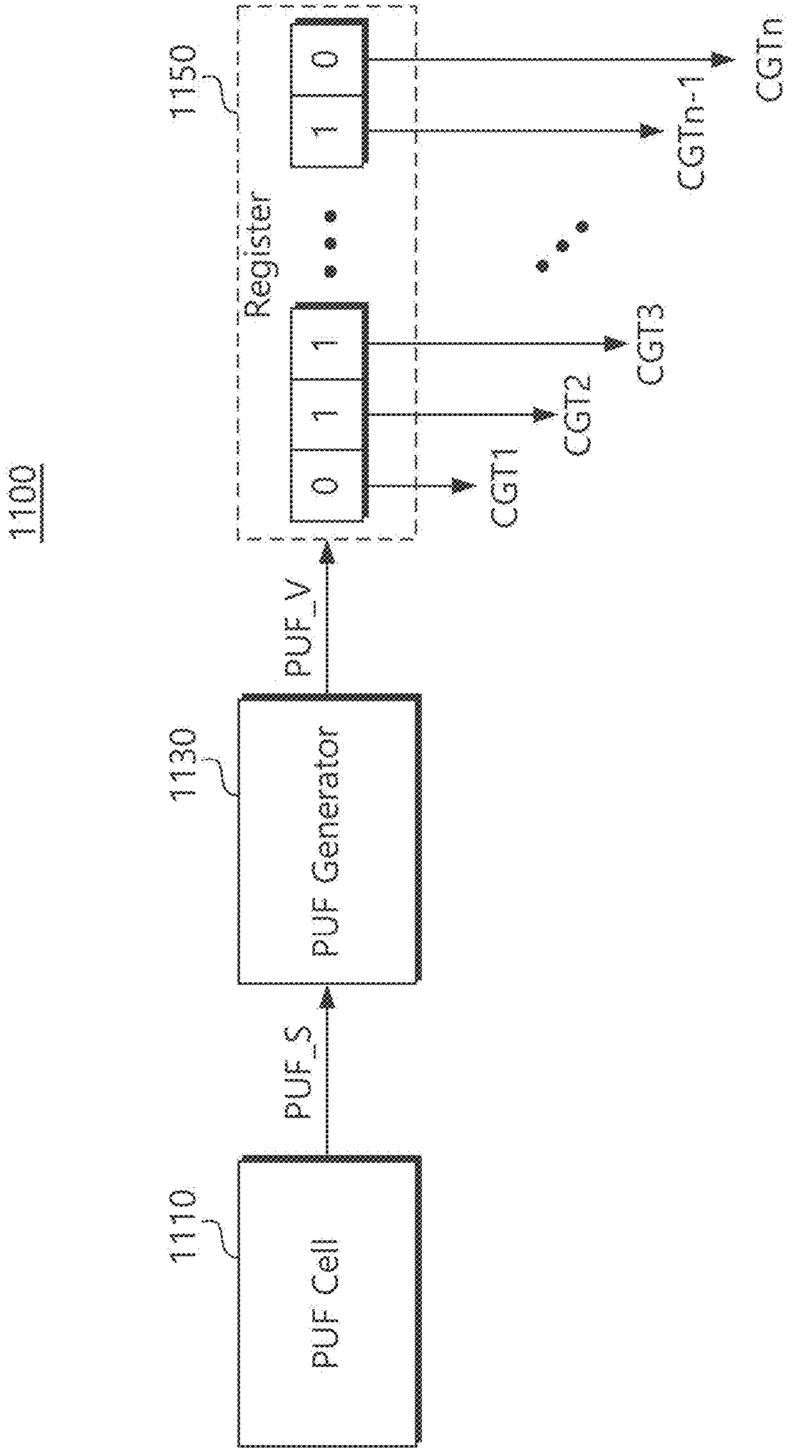
FIG. 2 is a block diagram showing an example configuration of the clock gating type generator of FIG. 1.

FIG. 2 is a block diagram showing an example configuration of the clock gating type generator of FIG. 1. Referring to FIG. 2, the clock gating type generator 1100 may include a PUF cell 1110, a PUF generator 1130, and a register 1150.

The PUF cell 1110 may generate a PUF source signal PUF_S. For example, the PUF cell 1110 may generate a unique PUF source signal PUF_S for the security chip 1000 based on a physically unclonable function PUF. The physically unclonable function PUF may refer to providing a unique value corresponding to hardware's intrinsic characteristics. For example, even if a plurality of hardware, such as semiconductor chips, are manufactured through the same process, each of the plurality of hardware will have slight physical variations, making them not completely identical. These variations can be used to extract a unique value from the hardware. This unique value can be applied to security-related tasks, such as secure communication, secure data processing, user identification, firmware update, etc. In this specification, the PUF source signal PUF_S or PUF value refers to the unique value or set of unique values generated based on the above-described fluctuations.

In some embodiments, the PUF cell 1110 that provides the PUF source signal may have any structure capable of generating a bit signal with a unique value. For example, the PUF cell 1110 may have an SRAM-type PUF structure, which relies on values stored in a static random access memory SRAM cell, or it could have a ring oscillator structure based on frequency variation. Alternatively, the PUF cell 1110 might use a leakage-based PUF structure, which depends on leakage current, or an arbiter PUF structure, where the signal path is arbitrarily determined. Additionally, the PUF cell 1110 may generate a bit signal with a unique value based on the differences between the threshold levels of logic gates.

In another embodiment, the PUF cell 1110 may include, but is not limited to, a PUF cell based on a transistor threshold voltage, an arbiter-based PUF cell (e.g., a feed-forward PUF cell, XOR PUF cell arranged in parallel with arbiter PUF cells), and lightweight PUF cells, etc. Additionally, the PUF cell 1110 may include ring oscillator-based PUF cells, memory-based PUF cells (e.g., SRAM PUF cells, latch type PUF cell, a flash memory PUF cell, a memristor PUF cell), and reconfigurable PUF cells that change based on laser beam or thermal changes.

The PUF generator 1130 generates a PUF value PUF_V in the form of a binary bit string based on the PUF source signal PUF_S. The PUF generator 1130 may be configured as part of the PUF cell 1110.

The register 1150 generates a clock gating type CGT with a preset length based on the PUF value PUF_V provided from the PUF generator 1130. The clock gating type CGT is a unique bit string generated by the clock gating type generator 1100, with different values for each chip, even if the chips are of the same type. The bits CGT1 to CGTn of the clock gating type CGT, whose length is determined by the register 1150, will be provided at least 1-bit to each flip-flop group, which will be described later.

As described above, the clock gating type generator 1100 may generate the unique clock gating type CGT of the individual security chip 1000 based on a physically unclonable function PUF. The function of the clock gating type generator 1100 is not limited to the physically unclonable function PUF method described above, and can be implemented through various means to generate a unique clock gating type CGT of the security chip 1000. For example, the PUF cell 1110 or the PUF generator 1130 may be replaced with one time program OTP memory that stores a unique identifier UID assigned to each security chip is stored. Alternatively, the PUF cell 1110 or the PUF generator 1130 may be replaced with a non-volatile memory such as eFlash that stores the unique value allocated to each security chip.

Figure 3:
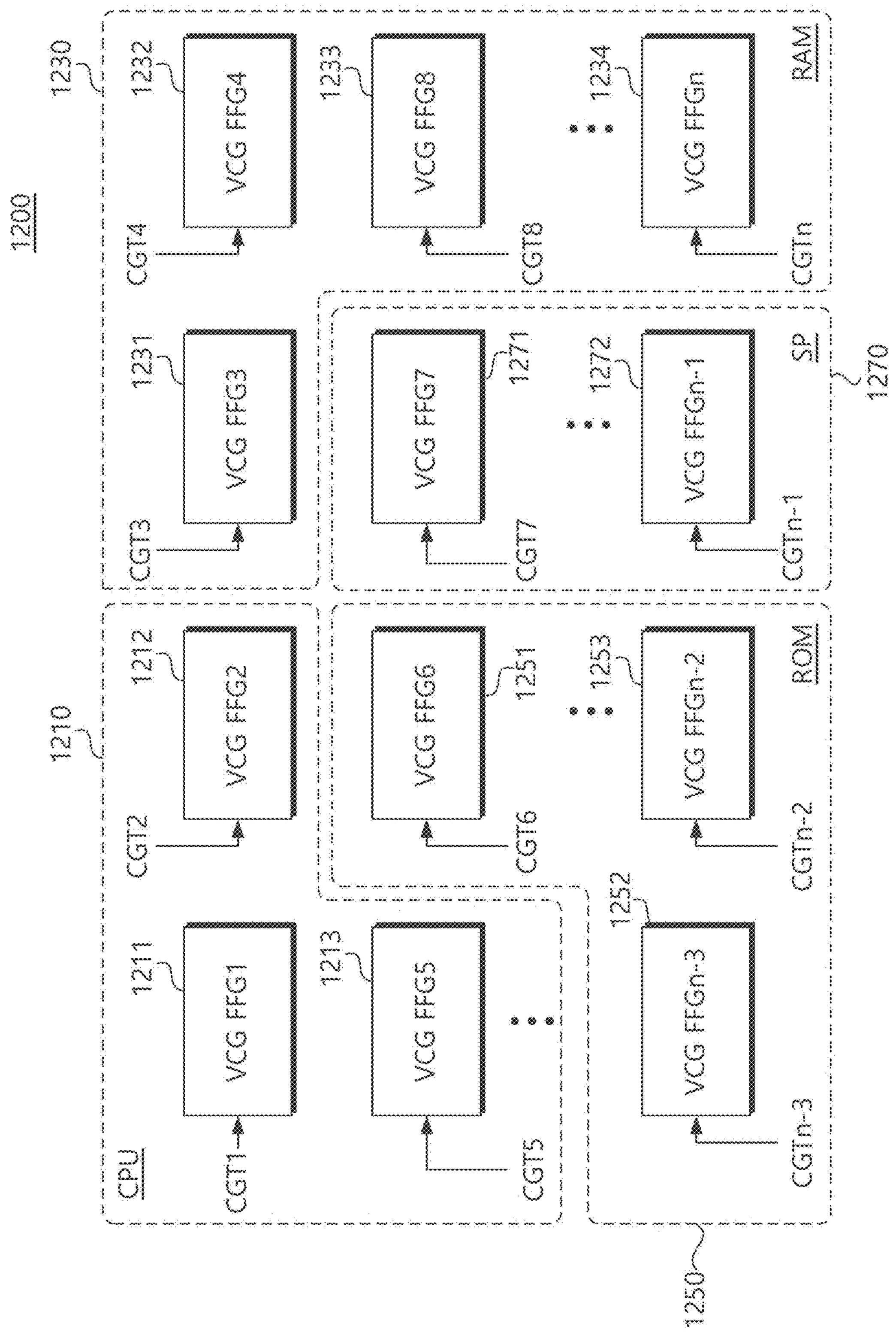
FIG. 3 is a block diagram showing the configuration of a main operation unit including a plurality of flip-flop groups driven by the variable clock gating method of FIG. 1.

FIG. 3 is a block diagram showing the configuration of a main operation unit including a plurality of flip-flop groups driven by the variable clock gating method of FIG. 1. Referring to FIG. 3, the CPU 1210, RAM 1230, ROM 1250, security processor 1270 that constitute the main operation unit 1200 (see FIG. 1) are variable clock gating flip-flop groups (VCG FFGi, 1≤i≤n).

The CPU 1210 includes flip-flop groups 1211, 1212, and 1213 driven by a variable clock gating method. The flip-flop groups 1211, 1212, and 1213 receive clock gating type signals CGT1, CGT2, and CGT5, respectively. The clock gating type signals CGT1, CGT2, CGT5 can each be provided as independent bit values. For example, the clock gating type signal CGT1 can be provided as a logic '1', the clock gating type signal CGT2 can be provided as a logic '0', and the clock gating type signal CGT5 can be provided as a logic '1'. The flip-flop groups 1211, 1212, and 1213 may each be included in components that perform the memory function or data input/output function of the CPU 1210.

RAM 1230 includes flip-flop groups 1231, 1232, 1233, and 1234 driven by the variable clock gating method. The flip-flop groups 1231, 1232, 1233, and 1234 receive clock gating type signals CGT3, CGT4, CGT8, and GCTn, respectively. The clock gating type signals CGT3, CGT4, CGT8, GCTn can each be provided as independent bit values. The flip-flop groups 1231, 1232, 1233, and 1234 may each be included in components that perform the memory function or data input/output function of the RAM 1230.

The ROM 1250 includes flip-flop groups 1251, 1252, and 1253 driven by the variable clock gating method. The flip-flop groups 1251, 1252, and 1253 receive clock gating type signals CGT6, CGTn−3, and CGTn−2, respectively. The clock gating type signals CGT6, CGTn−3, and CGTn−2 can each be provided as independent bit values. The flip-flop groups 1251, 1252, and 1253 may be included in components that perform the memory function or data input/output function of the ROM 1250, respectively.

The security processor 1270 includes flip-flop groups 1271 and 1272 driven by the variable clock gating method. The flip-flop groups 1271 and 1272 receive clock gating type signals CGT7 and CGTn−1, respectively. The clock gating type signals CGT7 and CGTn−1 can each be provided as independent bit values. The flip-flop groups 1271 and 1272 may be included in components that perform the memory function or data input/output function of the security processor 1270, respectively.

As described above, various components constituting the main operation unit 1200 may include the plurality of flip-flop groups that can variably control the clock gating method. The variable control of the clock gating method for these flip-flop groups is determined by the clock gating type CGT provided by the clock gating type generator 1100. The configuration of the plurality of flip-flop groups (VCG FFGi) will be explained in more detail with reference to FIG. 4, which will be described later.

Figure 4:
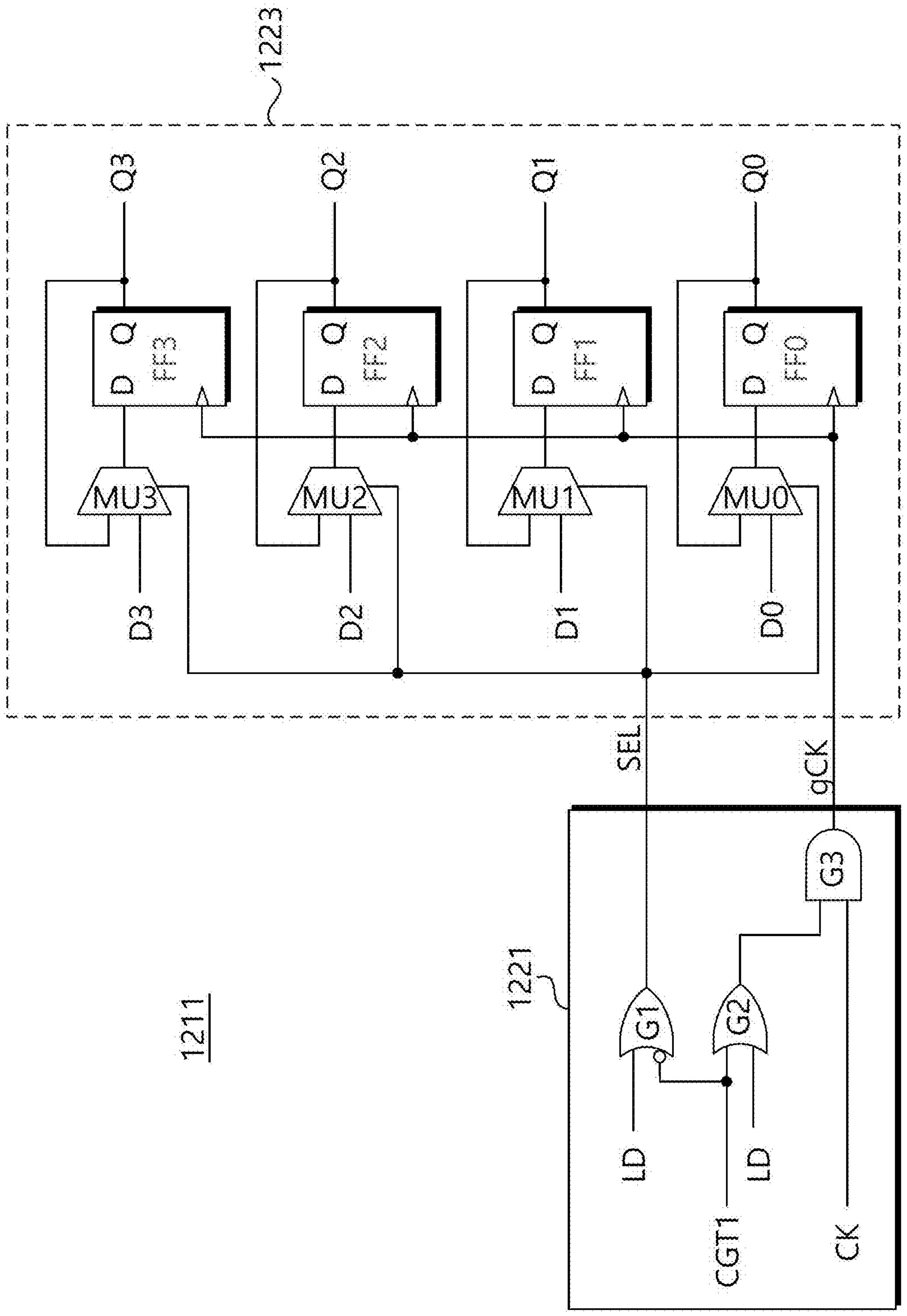
FIG. 4 is a circuit diagram showing the structure of one of the flip-flop groups driven by the variable clock gating method of FIG. 3.

FIG. 4 is a circuit diagram showing the structure of one of the flip-flop groups driven by the variable clock gating method of FIG. 3. Referring to FIG. 4, the flip-flop group 1211 includes a gating control circuit 1221 and a flip-flop array 1223.

The gating control circuit 1221 performs a variable clock gating operation of the flip-flop group 1211 according to the clock gating type CGT1. The gating control circuit 1221 provides an input clock signal CK to the flip-flop array 1223 according to the clock gating type CGT1 and a latch control signal LD. The gating control circuit 1221 generates a selection signal SEL according to the clock gating type CGT1 and the latch control signal LD. The selection signal SEL is a signal for selecting data input to the input terminal D of the flip-flops FF0, FF1, FF2 and FF3.

The gating control circuit 1221 may include OR gates G1 and G2 and AND gate G3 for this function. The first OR gate G1 generates the selection signal SEL through an OR operation of the latch control signal LD and the inverted clock gating type/CGT1. Accordingly, the selection signal SEL is output as logic '1' when the clock gating type CGT1 is logic '0' or the latch control signal LD is logic '1'. The second OR gate G2 performs the OR operation of the latch control signal LD and the clock gating type CGT1. The result of the logical OR operation is applied to a logical AND operation with the input clock signal CK by the AND gate G3. Ultimately, the AND gate G3 transmits the input clock signal CK to the clock of the flip-flops FF0 to FF3 as a gating clock signal gCK when the clock gating type CGT1 is logic '1' or the latch control signal LD is logic '1'. On the other hand, when either the clock gating type CGT1 or the latch control signal LD is logic '0', the AND gate G3 blocks the input clock signal CK from being transmitted to the clock input terminal of the flip-flops FF0 to FF3. In other words, the gating clock signal gCK is transmitted to the clock input terminals of the flip-flops FF0 to FF3 only when both the clock gating type CGT1 and the latch control signal LD are logic '1'.

The flip-flop array 1223 includes multiplexers MU0, MU1, MU2 and MU3 and the flip-flops FF0 to FF3. The multiplexers MU0 to MU3 select the input signals of each of the flip-flops FF0 to FF3 according to the selection signal SEL.

When the clock gating type CGT1 is logic '0', the input clock signal CK can be transmitted to the clock input terminal of the flip-flops FF0 to FF3 as the gating clock signal gCK only when the latch control signal LD is logic '1'. In this scenario, if the latch control signal LD is logic '0', the transmission of the gating clock signal gCK to the clock input terminals of the flip-flops FF0 to FF3 is blocked. Accordingly, toggling of the gating clock signal gCK may be blocked and current consumption may be reduced.

When the clock gating type CGT1 is logic '0' and the latch control signal LD is logic '1', the selection signal SEL is provided as logic '1'. In this scenario, the multiplexers MU0 to MU3 respectively select input data DO, D1, D2 and D3 and transfer it to the data input terminal D of the flip-flops FF0 to FF3.

When the clock gating type CGT1 is logic '1', the gating clock signal gCK is always transmitted to the clock input terminal of the flip-flops FF0 to FF3 regardless of the value of the latch control signal LD. Consequently, the toggling of the gating clock signal gCK at the clock input terminals of the flip-flops FF0 to FF3 may occur, which can relatively increase current consumption.

When the clock gating type CGT1 is logic '1', the selection signal SEL is provided as logic '1' only when the latch control signal LD is logic '1'. On the other hand, when the clock gating type CGT1 is logic '1' and the latch control signal LD is logic '0', the selection signal SEL is provided as logic '0'. In this scenario, the data input terminal D of the flip-flops FF0 to FF3 is connected to the data output terminal Q of each of the flip-flops FF0 to FF3.

An example operation of the flip-flop group 1211 in this embodiment has been described above. According to the flip-flop group 1211 of this embodiment, it is evident that the flip-flops FF0 to FF3 operate with different current consumption patterns based on the bit value of the clock gating type CGT1. Consequently, the current profiles of individual chips differ, even for chips of the same type, due to the unique clock gating type CGT settings of the security chip 1000. Therefore, template attacks that accumulate current profiles become impossible.

Figure 5:
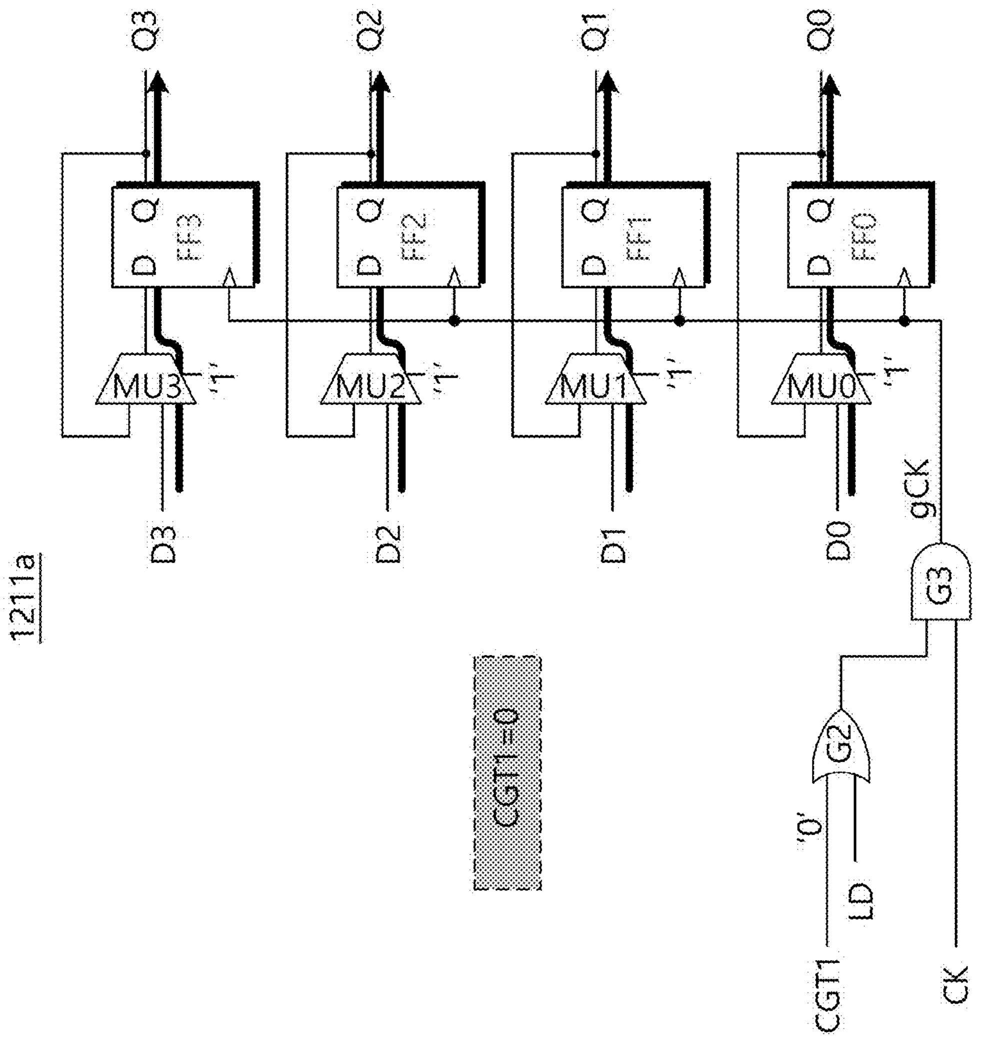
FIG. 5 is a diagram illustrating the operation of the flip-flop array when the clock gating type CGT1 in FIG. 4 is provided as logic '0'.

FIG. 5 is a diagram illustrating the operation of the flip-flop array when the clock gating type CGT1 in FIG. 4 is provided as logic '0'. Referring to flip flop group 1211*a* in FIG. 5, under the condition that the clock gating type CGT1 is logic '0', the gating clock signal gCK is transmitted to the clock input terminal of the flip-flops FF0 to FF3 only when the latch control signal LD is logic '1'.

Since the clock gating type CGT1 is logic '0', the first OR gate G1 of the gating control circuit (1221, see FIG. 4) always transmits the selection signal SEL of logic '1' to the multiplexers MU0 to MU3. Therefore, when the clock gating type CGT1 is logic '0', the multiplexers MU0 to MU3 transmit the input data DO to D3 to the data input terminal D of their corresponding flip-flops FF0 to FF3. The input data DO to D3 delivered to the data input terminal D of the flip-flops FF0 to FF3 is latched in response to the rising edge of the gating clock signal gCK and delivered to the output terminal Q of the flip-flops FF0 to FF3. Data is transmitted in the direction indicated by the bold arrow in FIG. 5.

When the clock gating type CGT1 is logic '0', the input clock signal CK passes through the AND gate G3 only when the latch control signal LD is logic '1', reaching the clock input terminal of the flip-flops FF0 to FF3 as a gating clock signal gCK. If the latch control signal LD is logic '0', the input clock signal CK is blocked from passing through the AND gate G3. Consequently, the toggling of the gating clock signal gCK is preventing, reducing current consumption.

From this, it can be seen that when the clock gating type CGT1 is logic '0', the clock gating is determined by the latch control signal LD. Specifically, the toggling of the gating clock signal gCK is controlled by the latch control signal LD. Therefore, in this mode, the amount of current consumed in the flip-flop group 1211 is relatively reduced.

Figure 6:
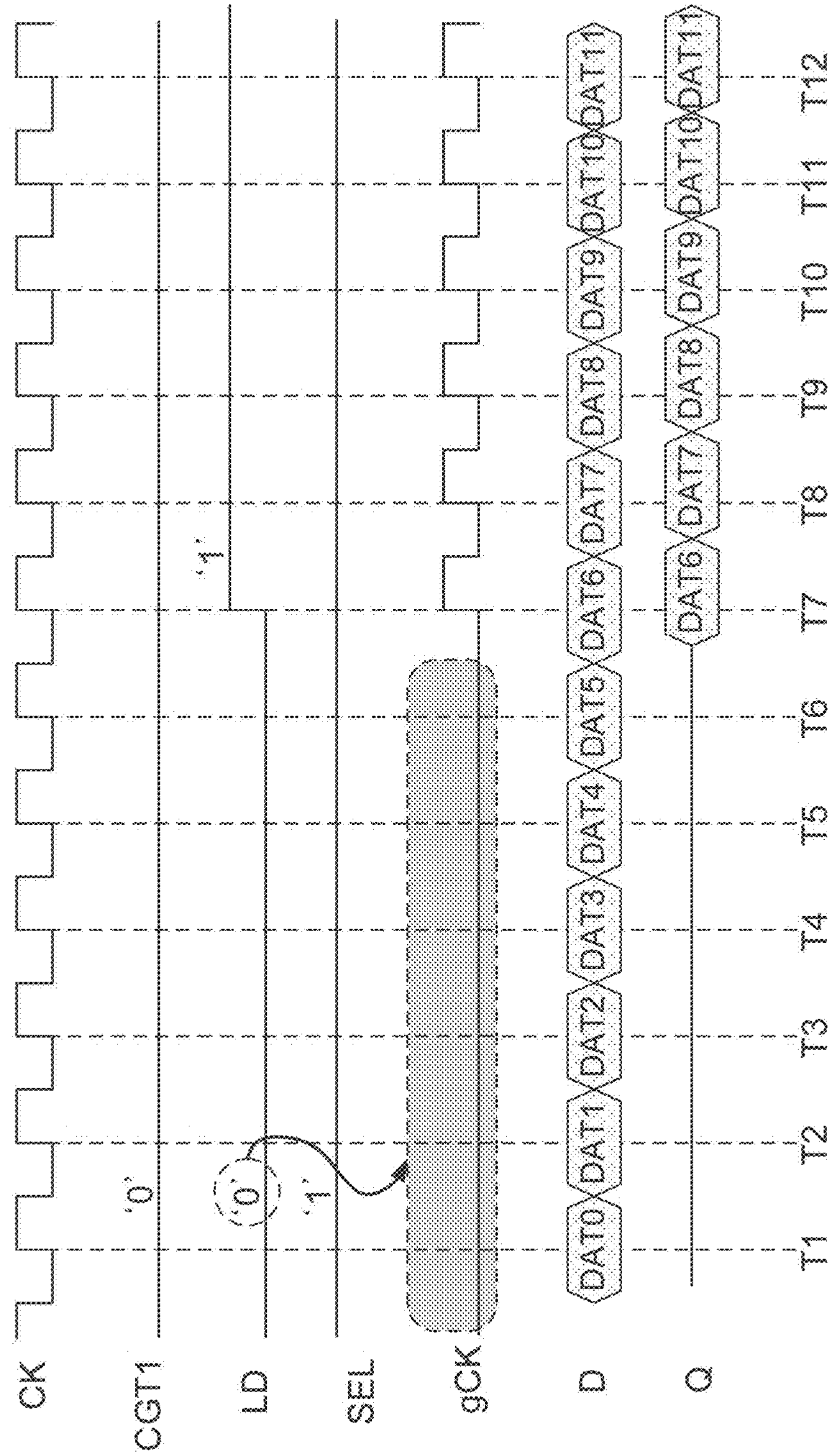
FIG. 6 is a timing diagram showing the operation of the flip-flop group of FIG. 5.

FIG. 6 is a timing diagram showing the operation of the flip-flop group 1211*a* of FIG. 5. Referring to FIG. 6, when the clock gating type CGT1 is logic 'O' and the latch control signal LD is logic '0', transmission of the gating clock signal gCK to the clock input terminals of the flip-flops FF0 to FF3 is blocked.

The clock signal CK for driving the security chip 1000 is continuously supplied to the gating control circuit 1221 (see FIG. 4). The clock signal CK is transmitted to the clock input terminal of the flip-flops FF0 to FF3 as a gating clock signal gCK by the AND gate G3.

At time T1, the clock gating type CGT1 is logic '0' and the latch control signal LD is provided as logic '0'. Then, the selection signal SEL corresponding to logic OR operation of the inverted clock gating type/CGT1 and the latch control signal LD is generated as logic '1'. In addition, the second OR gate G2 outputs logic '0', which is the logic OR operation of the clock gating type CGT1 and the latch control signal LD. The AND gate G3, which outputs the logic AND operation of the output of the second OR gate G2 and the clock signal CK, outputs logic '0'. In other words, the gating clock signal gCK is not transmitted to the clock input terminals of the flip-flops FF0 to FF3. This continues until T6, when the logic value of the latch control signal LD changes to '1'. Therefore, the toggling of the gating clock signal gCK does not occur from time T1 to time T6. Since the gating clock signal gCK is blocked, the latch operation to the flip-flops FF0 to FF3 of the input data DAT0, DAT1, DAT2, DAT3, DAT4 and DAT5 are blocked.

At time T7, the latch control signal LD transitions to logic '1' while the clock gating type CGT1 is '0'. Then, the selection signal SEL maintains logic '1'. In addition, the second OR gate G2 outputs logic '1', which is the logic OR operation of the clock gating type CGT1 and the latch control signal LD. The AND gate G3, which outputs the logic AND of the output of the second OR gate G2 and the clock signal CK, passes the clock signal CK. Accordingly, the gating clock signal gCK is transmitted to the clock input terminals of the flip-flops FF0 to FF3. After T7, the toggling of the gating clock signal gCK occurs, and the input data DAT6, DAT7, DAT8, DAT9, DAT10 and DAT11 is latched in the flip-flops FF0 to FF3 at the rising edge of the gating clock signal gCK.

As explained in FIG. 5 and FIG. 6 above, when the clock gating type CGT1 is logic '0', the clock gating of the flip-flops FF0 to FF3 varies according to the latch control signal LD. When the latch control signal LD is logic '0', the toggling of the gating clock signal gCK input to the flip-flops FF0 to FF3 is blocked. In other words, clock gating of the flip-flops FF0 to FF3 is input to the flip-flops FF0 to FF3 only when the latch control signal LD is logic '1'. As a result, when the clock gating type CGT1 is logic '0', the amount of current consumed in the flip-flop group 1211 may be relatively reduced.

Figure 7:
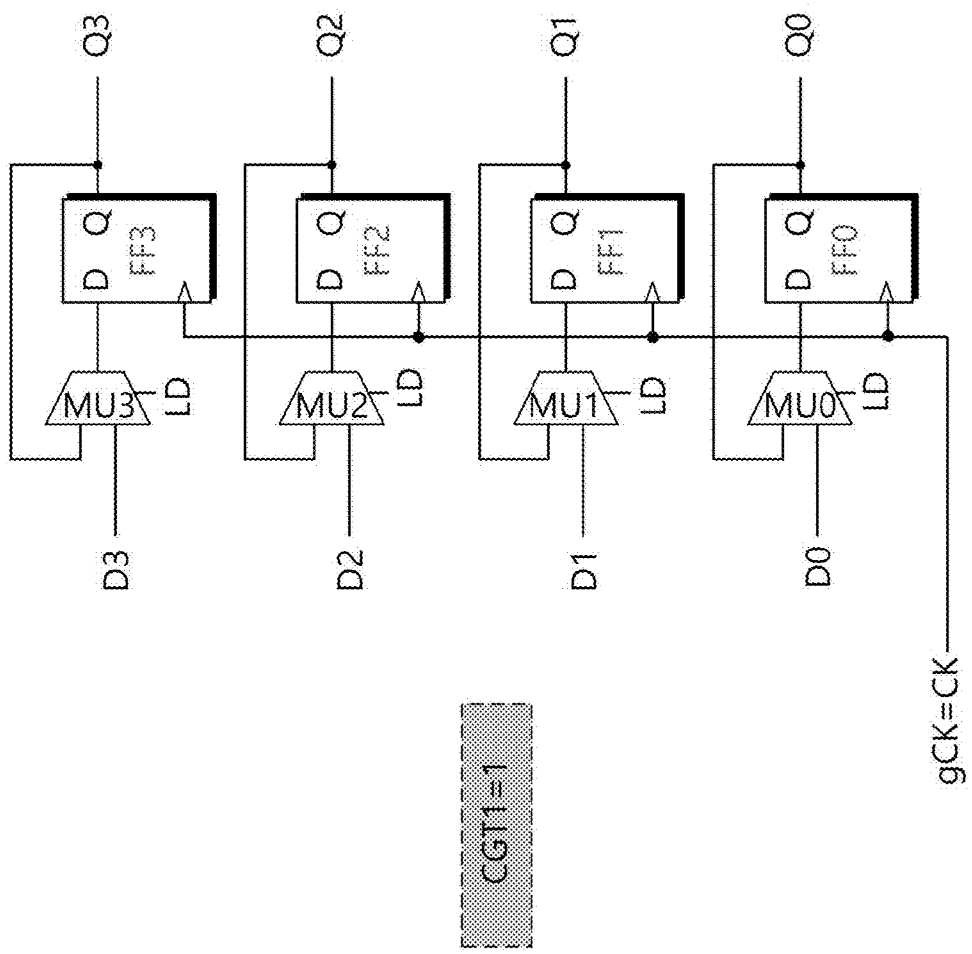
FIG. 7 is a diagram showing the operation of the flip-flop array when the clock gating type CGT1 in FIG. 4 is provided as logic '1'.

FIG. 7 is a diagram showing the operation of the flip-flop array when the clock gating type CGT1 in FIG. 4 is provided as logic '1'. Referring to flip flop ground 1211*a* in FIG. 7, when the clock gating type CGT1 is logic '1', the gating clock signal gCK is applied to the clock input terminal of the flip-flops FF0 to FF3 regardless of the value of the latch control signal LD.

The inverted clock gating type CGT1 is input as logic '0' to the first OR gate G1 of the gating control circuit (1221, see FIG. 4). Accordingly, the first OR gate G1 transmits the latch control signal LD as the selection signal SEL to the multiplexers MU0 to MU3. When the clock gating type CGT1 is logic '1', the multiplexers MU0 to MU3 transfer the input data DO to D3 to the data input terminal D of the flip-flops FF0 to FF3 according to the latch control signal LD. In other words, when the latch control signal LD is logic '0', even if the gating clock signal gCK is supplied to the flip-flops FF0 to FF3, the multiplexers MU0 to MU3 block transmission of input data DO to D3. In other words, when the latch control signal LD is logic '0', the multiplexers MU0 to MU3 connect the output terminal Q of the flip-flops FF0 to FF3 to the input terminal D. Therefore, even if the gating clock signal gCK is toggled, the input of the input data DO to D3 to the flip-flops FF0 to FF3 is blocked.

On the other hand, when the latch control signal LD is logic '1', the multiplexers MU0 to MU3 transmit the input data DO to D3 to the input terminal D of the flip-flops FF0 to FF3. In other words, the input data DO to D3 may be input to the flip-flops FF0 to FF3 in response to the rising edge of the gating clock signal gCK.

When the clock gating type CGT1 is logic '1', the input clock signal CK is transmitted as a gating clock signal gCK to the clock input terminals of the flip-flops FF0 to FF3 regardless of the logic value of the latch control signal LD. When the clock gating type CGT1 is logic '1', the toggling of the gating clock signal gCK occurs regardless of the latch control signal LD. Therefore, the current consumed in the flip-flop group 1211 increases relative to when the clock gating type CGT1 is logic '0'.

Figure 8:
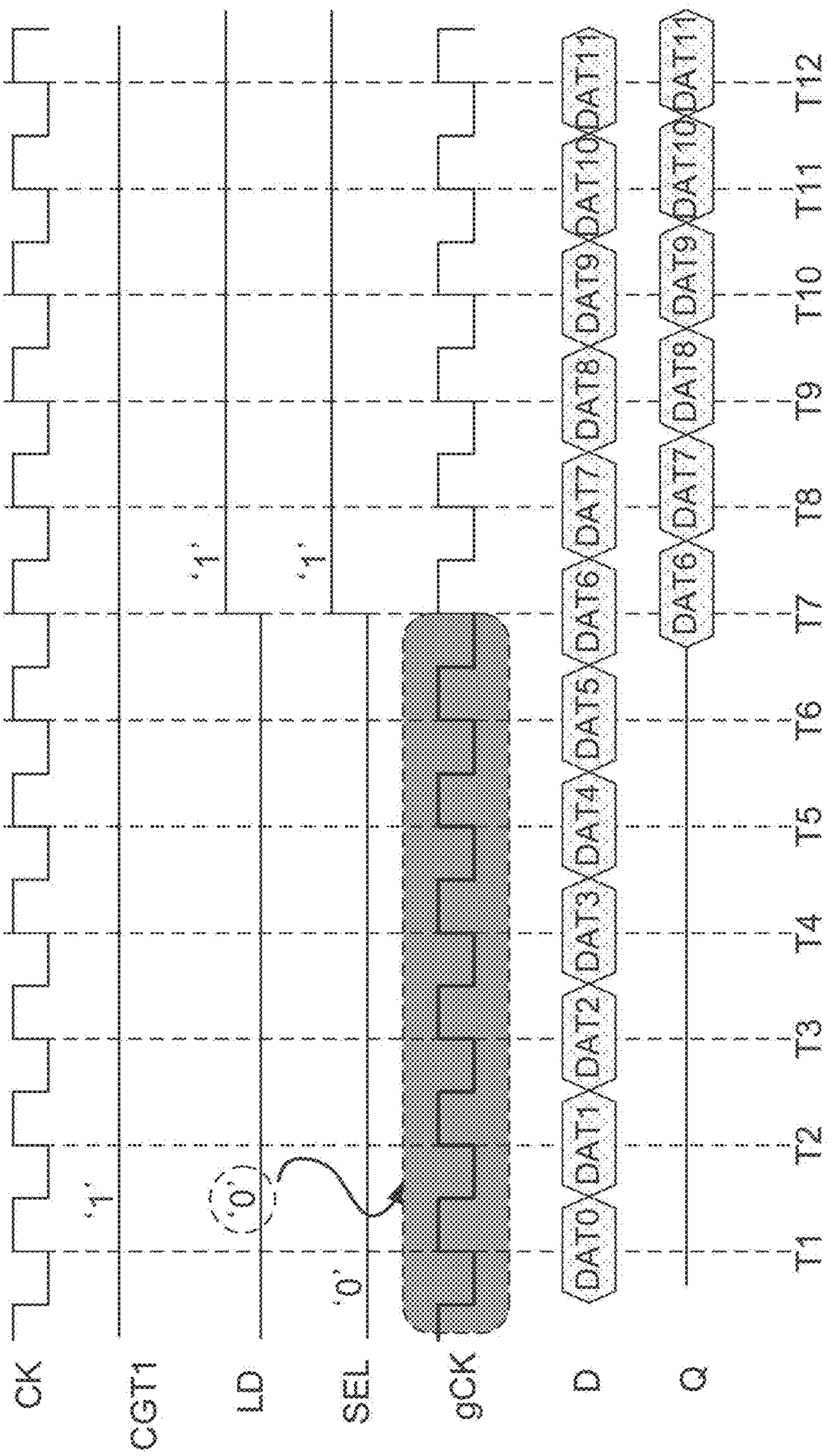
FIG. 8 is a timing diagram showing the operation of the flip-flop group of FIG. 7.

FIG. 8 is a timing diagram showing the operation of the flip-flop group 1211*b* of FIG. 7. Referring to FIG. 8, when the clock gating type CGT1 is logic '1', the gating clock signal gCK is transmitted to the clock input terminals of the flip-flops FF0 to FF3 regardless of the logic value of the latch control signal LD.

The input clock signal CK for driving the security chip 1000 is continuously supplied to the gating control circuit 1221 (see FIG. 4). The input clock signal CK is transmitted to the clock input terminal of the flip-flops FF0 to FF3 as a gating clock signal gCK through the AND gate G3.

At time T1, the clock gating type CGT1 is provided as logic '1' and the latch control signal LD is provided as logic '0'. Then, the selection signal SEL, which corresponds to the logical OR operation of the inverted clock gating type/CGT1 and the latch control signal LD, is provided with the same value as the latch control signal LD. In addition, the second OR gate G2 outputs logic '1', which is the OR operation of the clock gating type CGT1 and the latch control signal LD. The AND gate G3, which outputs the logical AND operation of the output of the second OR gate G2 and the input clock signal CK, functions to pass the input clock signal CK. In other words, the gating clock signal gCK is transmitted to the clock input terminals of the flip-flops FF0 to FF3. This continues until T6, when the logic value of the latch control signal LD changes to '1'. Accordingly, the toggling of the gating clock signal gCK occurs from time T1 to time T6. However, according to the selection of the multiplexers MU0 to MU3, the input of the input data DAT0 to DAT5 to the flip-flops FF0 to FF3 is blocked.

At time T7, the latch control signal LD transitions to logic '1' while the clock gating type CGT1 is '1'. Then, the selection signal SEL transitions to logic '1'. In addition, the second OR gate G2 outputs logic '1', which is the OR operation of the clock gating type CGT1 and the latch control signal LD. The AND gate G3, which outputs the logical AND operation of the output of the second OR gate G2 and the input clock signal CK, functions to pass the input clock signal CK. Accordingly, the gating clock signal gCK is transmitted to the clock input terminals of the flip-flops FF0 to FF3. The toggling of the gating clock signal gCK continues even after T7, and the input data DAT6 to DAT11 is latched in the flip-flops FF0 to FF3 at the rising edge of the gating clock signal gCK.

As explained in FIG. 7 and FIG. 8 above, when the clock gating type CGT1 is logic '1', clock gating of the flip-flops FF0 to FF3 occurs regardless of the latch control signal LD. Therefore, it can be predicted that the current consumption may be relatively higher compared to when the clock gating type CGT1 is logic '0'.

Figure 9:
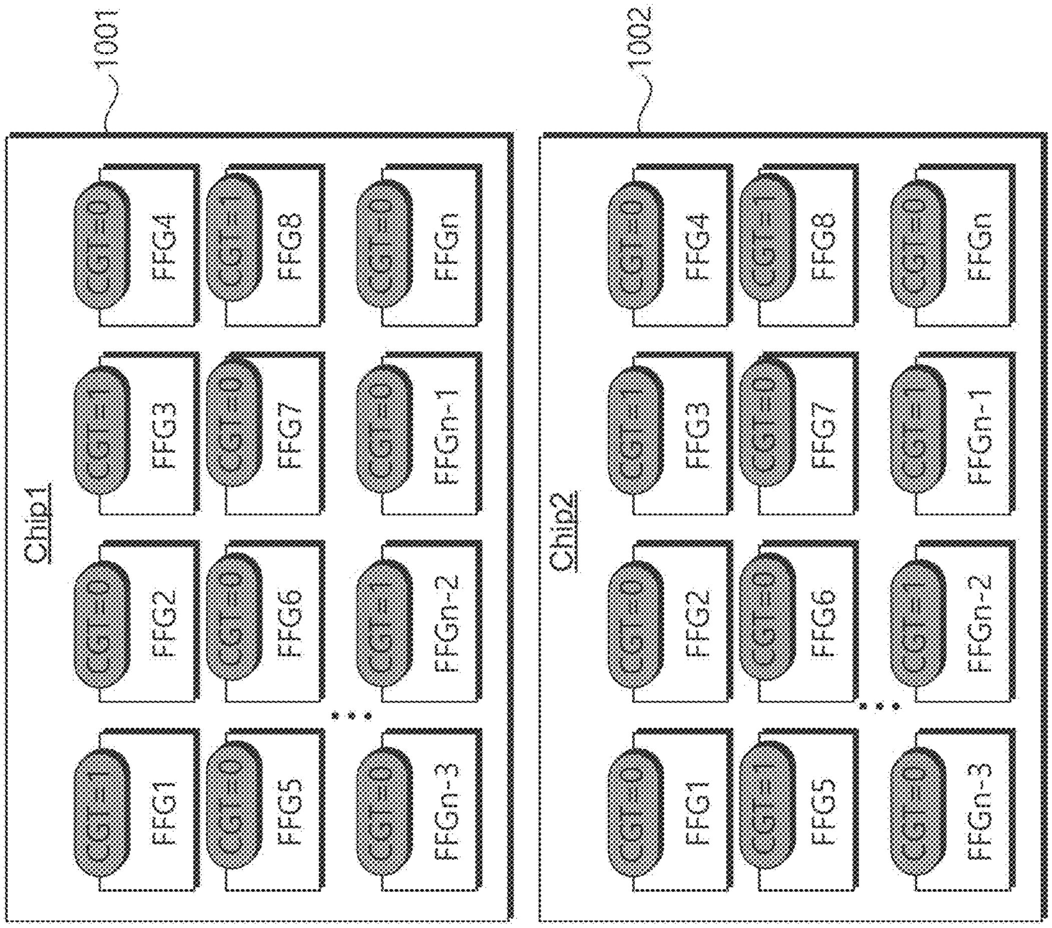
FIG. 9 is a diagram showing an example of clock gating type CGT settings of the same type of security chips.

FIG. 9 is a diagram showing an example of clock gating type CGT settings for the same type of security chips. Referring to FIG. 9, even if the security chips 1001 and 1002 are of the same type, the current profiles of the chips may differ during the same operation according to the clock gating type CGT that varies in units of flip-flop groups FFGi.

The first security chip 1001 may be grouped into n flip-flop groups FFG1 to FFGn. Additionally, the second security chip 1002 may also be grouped into n flip-flop groups FFG1 to FFGn. Each flip-flop group FFG1 to FFGn of the security chips 1001 and 1002 is assigned a chip-specific clock gating type CGT provided by a clock gating type generator. As a result, different current consumption characteristics are observed based on the clock gating type CGT set during the operation of each flip-flop group FFG1 to FFGn.

Assume that the same operation is performed with the flip-flop group FFG1 of the first security chip 1001 and the flip-flop group FFG1 of the second security chip 1002 set to different clock gating types CGT. For example, the clock gating type CGT of the flip-flop group FFG1 of the first security chip 1001 may be set to '1', while the clock gating type CGT of the flip-flop group FFG1 of the second security chip 1002 may be set to '0'. Consequently, even though the flip-flop group FFG1 of the first security chip 1001 and the flip-flop group FFG1 of the second security chip 1002 perform the same operation, the different clock gating methods result in relatively lower current consumption for the second security chip 1002. In this manner, if all remaining flip-flop groups FFG2 to FFGn are set to the chip's unique clock gating type CGT, the current profile of the first security chip 1001 and the second security chip 1002 may be clearly differentiated, even when performing the same operation.

Figure 10:
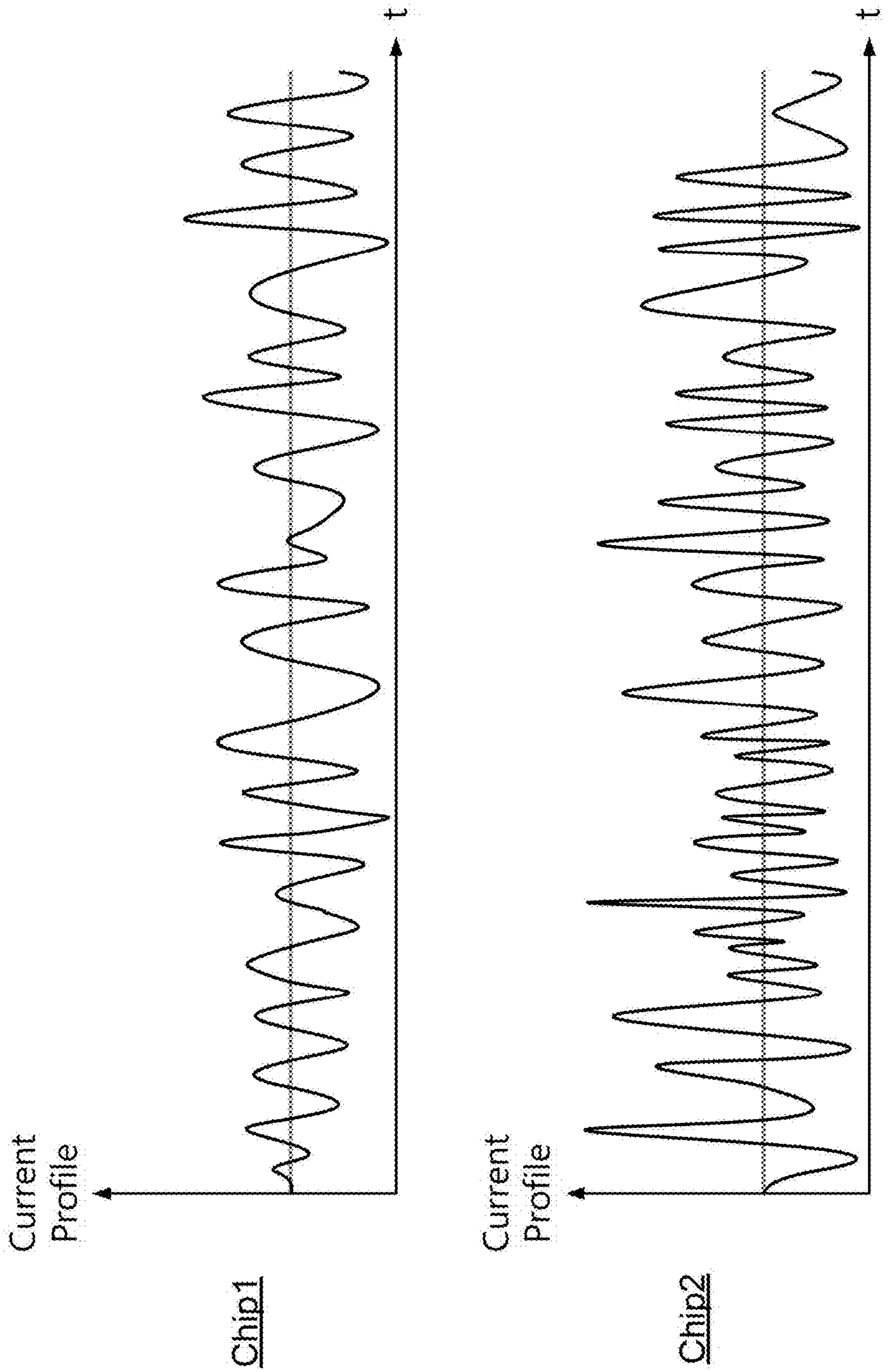
FIG. 10 is a waveform diagram showing a current profile measured when performing the same operation on the same type of security chips of FIG. 9.

FIG. 10 is a waveform diagram showing a current profile measured when performing the same operation on the same type of security chips of FIG. 9. Referring to FIG. 10, the current profile of the first security chip 1001 may be completely different from the current profile of the second security chip 1002 according to the clock gating type CGT setting of a different value.

It can be observed that the waveform of the first security chip 1001 has a relatively small number of current peaks and less variation compared to that of the second security chip 1002. This difference in current profiles is due to the fact that the clock gating method for each flip-flop group FFG1 to FFGn of the same type of security chips 1001 and 1002 is determined based on chip-specific parameters. Therefore, template attacks on security chips can be blocked by setting the clock gating type CGT.

Figure 11:
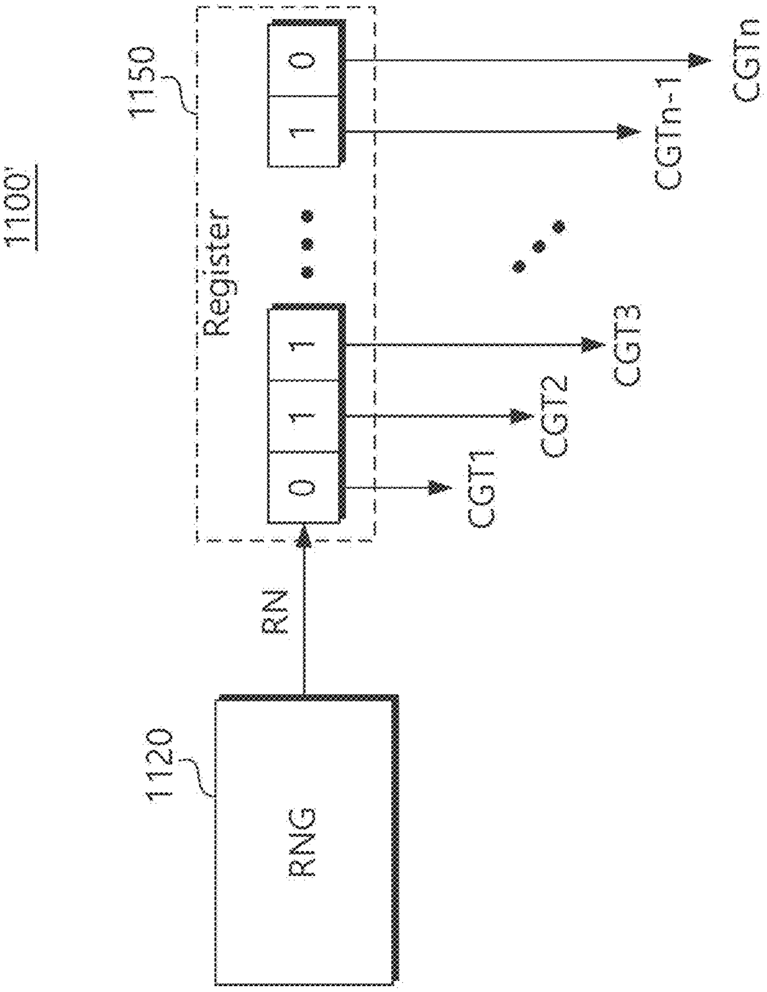
FIG. 11 is a block diagram showing another embodiment of the clock gating type generator of FIG. 1.

FIG. 11 is a block diagram showing another embodiment of the clock gating type generator of FIG. 1. Referring to FIG. 11, the clock gating type generator 1100' may include a random number generator 1120 and a register 1150.

The random number generator 1120 generates a random number RN when the security chip (1000, see FIG. 1) is powered on or when the main operation unit (1200, see FIG. 1) operates, and provides this number to the register 1150. The random number generator 1120 ensures that a different random number sequence is generated each time, even for security chips of the same type. Consequently, the clock gating type CGT arrangement for the same type of security chip can be set differently using the random number RN generated from the random number generator 1120. Algorithms or elements for generating random numbers can be selected arbitrarily. For example, a pseudo-random binary sequence PRBS or a linear feedback shift register LFSR may be used. However, the random number generation method is not limited to the above-described method.

The register 1150 generates the clock gating type CGT with a preset length based on the random number sequence provided from the random number generator 1120. Since the clock gating type CGT is generated based on the random number sequence, it is a unique bit string of the clock gating type generator 1100' and is generated with different values for each individual chip even if the chips are of the same type. The bits CGT1 to CGTn of the clock gating type CGT, the length of which is determined by the register 1150, will be distributed in bit units to flip-flop groups FFGi.

As described above, the clock gating type generator 1100' may generate the unique clock gating type CGT of the security chip 1000 based on the random number sequence generated by the random number generator 1120.

Figure 12:
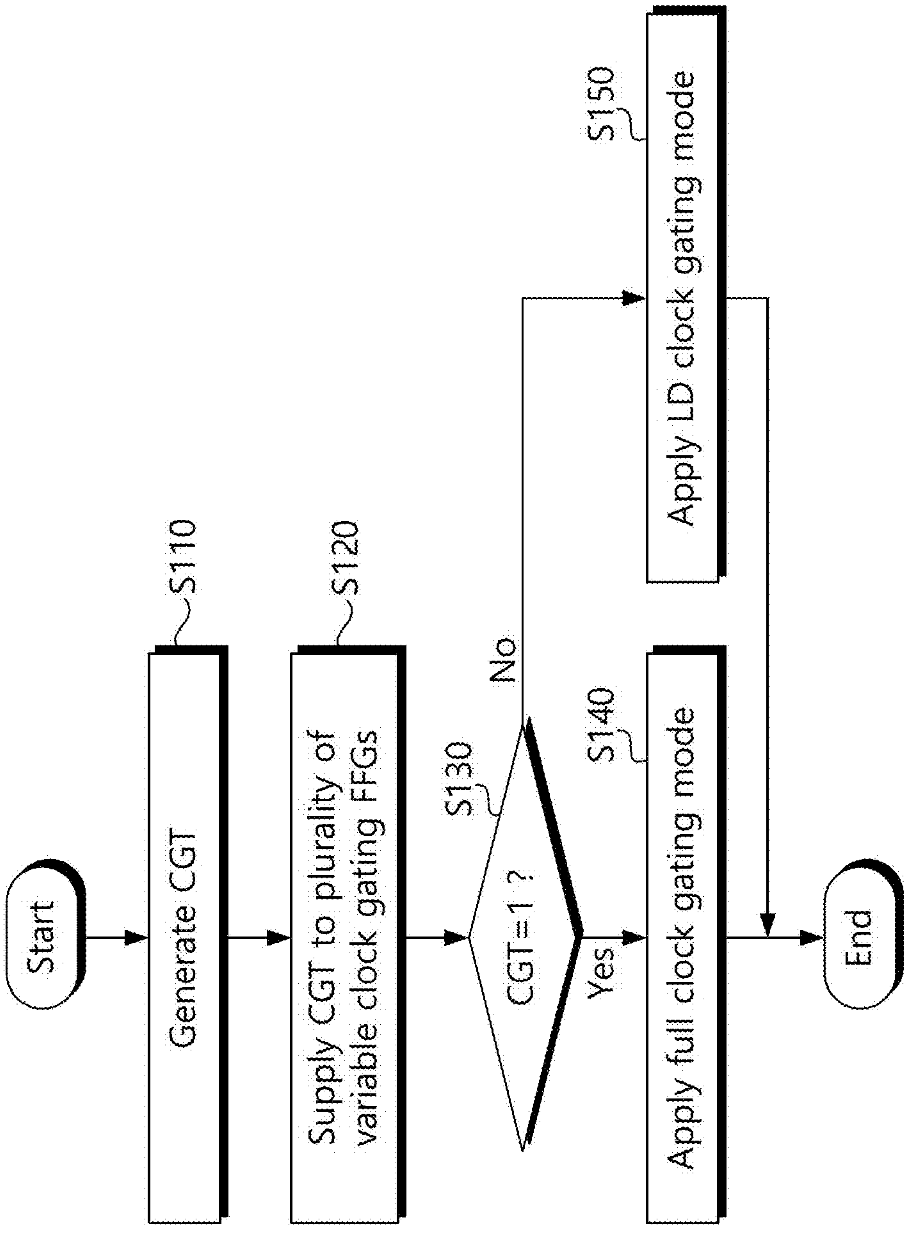
FIG. 12 is a flowchart showing the generation of clock gating type CGT in the security chip of the present invention and the procedure for providing it to flip-flop groups.

FIG. 12 is a flowchart showing the generation of clock gating type CGT in the security chip of an embodiment of the inventive concept and the procedure for providing it to flip-flop groups. Referring to FIG. 12, a chip-specific clock gating type CGT can be generated by the clock gating type generator 1100 (see FIG. 2) and provided to the flip-flop groups.

In step S110, the clock gating type generator 1100 generates the clock gating type CGT to be provided as a unique value of the chip. For this function, the clock gating type generator 1100 may generate a bit string based on a physically unclonable function PUF or a random number generation algorithm. Alternatively, the clock gating type generator 1100 may receive a multi-bit clock gating type CGT from a non-volatile memory such as an OTP memory or eFlash that stores a unique chip identifier.

In step S120, the clock gating type CGT generated by the clock gating type generator 1100 is transmitted to the variable clock gating flip-flop groups VCG FFGs. A clock gating type CGT may be provided to all flip-flop groups of the security chip 1000 or to some of the flip-flop groups.

In step S130, each flip-flop group that has received the clock gating type CGT selects a clock gating mode according to the clock gating type CGT. If the clock gating type CGT is logic '1' ('Yes' direction), the procedure moves to step S140. On the other hand, if the clock gating type CGT is logic '0' ('No' direction), the procedure moves to step S150.

In step S140, the flip-flop group receives a clock signal regardless of the latch control signal LD. In other words, even if data reception is blocked in the flip-flop group, a clock signal is input, and as a result, a relatively large current is consumed.

In step S150, the clock gating mode of the clock signal CK provided to the flip-flop group is determined according to the logic value of the latch control signal LD. For example, if the latch control signal LD is logic '0', transmission of the clock signal CK to the clock input terminal of the flip-flop group is blocked. On the other hand, if the latch control signal LD is logic '1', the clock signal CK is transmitted to the clock input terminal of the flip-flop group, and data input to the flip-flop group is activated.

The clock gating method for flip-flop groups according to the clock gating type CGT setting in the security chip 1000 of the described embodiment has been explained. In this embodiment, the security chip 1000 can generate a unique clock gating type CGT, even for chips of the same type. As a result, each security chip possesses sufficient defense capability against template attacks that accumulate current profiles for the chips.

The above are specific embodiments for carrying out the present invention. In addition to the above-described embodiments, the present invention may include simple design changes or easily alterable embodiments. Moreover, the present invention encompasses techniques that can be readily modified and implemented using the embodiments. Therefore, the scope of the present invention should not be limited to the above-described embodiments, but should be defined by the claims and their equivalents, as well as any claims to be described later.

What is claimed is:

1. A security chip, comprising:

a clock gating type generator configured to generate a clock gating type based on chip-specific parameters; and a main operation unit including a plurality of flip-flop groups, one or more of the plurality of flip-flop groups included in each of a plurality of functional blocks in the main operation unit, wherein each of the plurality of flip-flop groups is configured to receive a gating clock signal at a clock input terminal in a first gating mode or a second gating mode being set based on at least a bit of the clock gating type, wherein the first gating mode results in a different current consumption pattern compared to the second gating mode, wherein the plurality of functional blocks results in different current consumption patterns from one another based on the first gating mode or the second gating mode of the plurality of flip-flop groups.

2. The security chip of claim 1, wherein the clock gating type generator comprises:

a bit string generator configured to generate a bit string using a physically unclonable function or a chip identifier; and a register configured to generate the clock gating type of a predetermined length from the bit string, wherein bits of the clock gating type are configured to be distributed to the plurality of flip-flop groups without duplication.

3. The security chip of claim 2, wherein the bit string generator includes a one-time programmable (OTP) memory or eFlash that stores the bit string.

4. The security chip of claim 1, wherein the clock gating type generator comprises:

a random number generator configured to generate a random number sequence; and a register configured to generate the clock gating type of a predetermined length from the random number sequence.

5. The security chip of claim 1, wherein each of the plurality of flip-flop groups comprises:

at least one flip-flop configured to receive input data in synchronization with the gating clock signal; and a gating control circuit configured to transmit or block the gating clock signal to the clock input terminal in response to at least the bit of the clock gating type and a latch control signal.

6. The security chip of claim 5, wherein the gating control circuit comprises:

a first OR gate configured to perform a logical OR operation of the latch control signal and at least the bit of the clock gating type wherein if either or both of the latch control signal and the clock gating type is logic '1', an output of the first OR gate is logic '1'; and an AND gate configured to output a result of a logical AND operation of the output of the first OR gate and an input clock signal to the clock input terminal.

7. The security chip of claim 6, wherein the gating control circuit comprises a second OR gate configured to perform a logical OR operation of the latch control signal and an inversion of at least the bit of the clock gating type.

8. The security chip of claim 7, wherein each of the plurality of flip-flop groups comprises a multiplexer configured to transmit input data or output data to a data input terminal of the at least one flip-flop according to the output of the second OR gate.

9. A clock gating method of a security chip, comprising:

generating a clock gating type corresponding to a unique bit string of the security chip;

distributing at least a bit of the clock gating type to a plurality of flip-flop groups included in the security chip, one or more of the plurality of flip-flop groups included in each of a plurality of functional blocks in the security chip; and transmitting a gating clock signal to clock input terminals of flip-flops in at least one of the plurality of flip-flop groups in a first gating mode or a second gating mode being set based on at least the bit of the clock gating type assigned to the at least one of the plurality of flip-flop groups, wherein the first gating mode and the second gating mode are associated with different current consumption patterns, and wherein the plurality of functional blocks results in different current consumption patterns from one another based on the first gating mode or the second gating mode of the plurality of flip-flop groups.

10. The method of claim 9, wherein in the generating the clock gating type, the unique bit string is generated using a physically unclonable function, a chip identifier, or a random number generator.

11. The method of claim 9, wherein 1-bit of the clock gating type is provided to each of the plurality of flip-flop groups, and wherein bits of the clock gating type are configured to be distributed to the plurality of flip-flop groups without duplication.

12. The method of claim 9, further comprising:

receiving a latch control signal to activate or deactivate data reception of the flip-flops, for at least one of the plurality of flip-flop groups:

performing, by a first OR gate, a logical OR operation of a latch control signal and at least the bit of the clock gating type assigned to the at least one of the plurality of flip-flop groups, wherein if either of the latch control signal and at least the bit of the clock gating type assigned to the at least one of the plurality of flip-flop groups is logic '1' and if both of the latch control signal and the clock gating type assigned to the at least one of the plurality of flip-flop groups are logic '1', an output of the first OR gate is logic '1', and performing, by an AND gate, a logical AND operation of the output of the first OR gate and an input clock signal, wherein in the first gating mode, toggling of the clock signal is activated or deactivated depending on a logic value of the latch control signal, and in the second gating mode, toggling of the clock signal is activated irrespective of the logic value of the latch control signal.

13. The method of claim 12, wherein when the latch control signal is activated, input data is transmitted to data input terminals of the flip-flops, and when the latch control signal is deactivated, output terminals of the flip-flops are connected to the data input terminals.

14. A security chip, comprising:

a clock gating type generator configured to generate a chip-specific clock gating type; and a plurality of flip-flop groups included in each of a plurality of functional blocks in the security chip, wherein each of the plurality of flip-flop groups is configured to be set to a clock gating mode with different current consumption patterns based on at least a bit of the clock gating type, wherein each of the plurality of flip-flop groups comprises:

at least one flip-flop configured to receive input data synchronized with a gating clock signal; and a gating control circuit configured to transmit or block the gating clock signal to a clock input terminal of the at least one flip-flop in response to a latch control signal and at least the bit of the clock gating type, wherein the plurality of functional blocks results in different current consumption patterns from one another based on the clock gating mode of each of the plurality of flip-flop groups.

15. The security chip of claim 14, wherein the clock gating type generator generates the clock gating type based on a physically unclonable function, a chip identifier, or a random number generator, and wherein bits of the clock gating type are configured to be distributed to the plurality of flip-flop groups without duplication.

16. The security chip of claim 15, wherein the clock gating type generator includes a one-time programmable (OTP) memory or non-volatile memory to store the clock gating type.

17. The security chip of claim 14, wherein the gating control circuit comprises:

a first OR logic gate configured to generate a selection signal by performing a logical OR operation of the latch control signal and an inversion of at least the bit of the clock gating type;

a second OR logic gate configured to perform the logical OR operation of the latch control signal and at least the bit of the clock gating type and output logic '1' in a condition where the latch control signal and at least the bit of the clock gating type are both logic '1' and in another condition where one of the latch control signal and at least the bit of the clock gating type is logic '1'; and a third AND logic gate configured to transmit or block at least the bit of the gating clock signal to the clock input terminal as a result of a logical AND operation of the output of the second OR logic gate and an input clock signal.

18. The security chip of claim 17, wherein the clock gating mode includes:

a first gating mode when the clock gating type is logic '0'; or a second gating mode when the clock gating type is logic '1'.

19. The security chip of claim 18, wherein in the first gating mode, when the latch control signal is logic '0', an output of the third AND logic gate is deactivated, and when the latch control signal is logic '1', the output of the third AND logic gate is activated, and wherein in the second gating mode, the output of the third AND logic gate is activated irrespective of the logic value of the latch control signal.

20. The security chip of claim 17, further comprising:

a multiplexer configured to selectively transmit input data to a data input terminal of the at least one flip-flop in response to the selection signal.

* * * * *